Nov. 8, 1960 W. WELKOWITZ 2,959,054
ULTRASONIC FLOWMETER
Filed Jan. 14, 1957 2 Sheets-Sheet 1
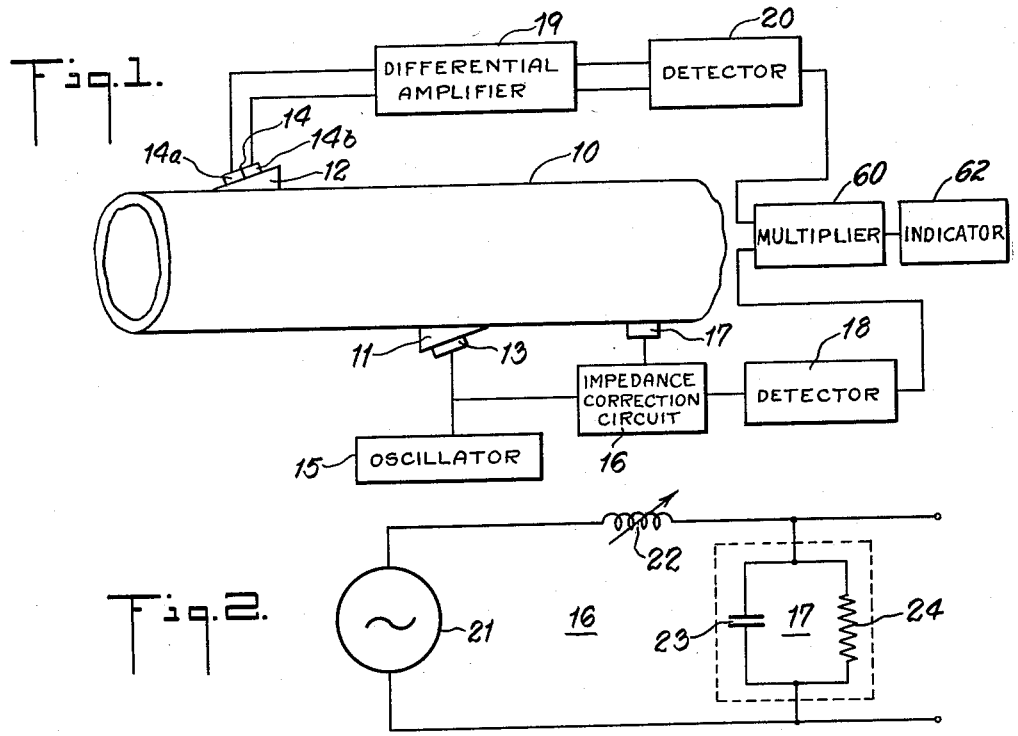
Fig.1.
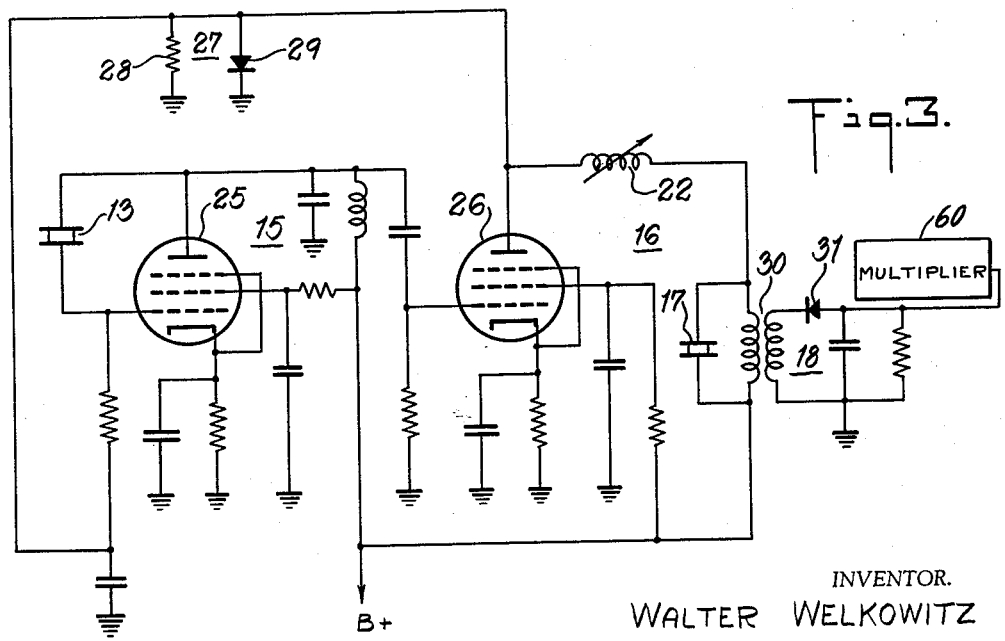
Fig.2.
Fig.3.
INVENTOR.
WALTER WELKOWITZ
BY
Cyrus D. Samuelson
ATTORNEY

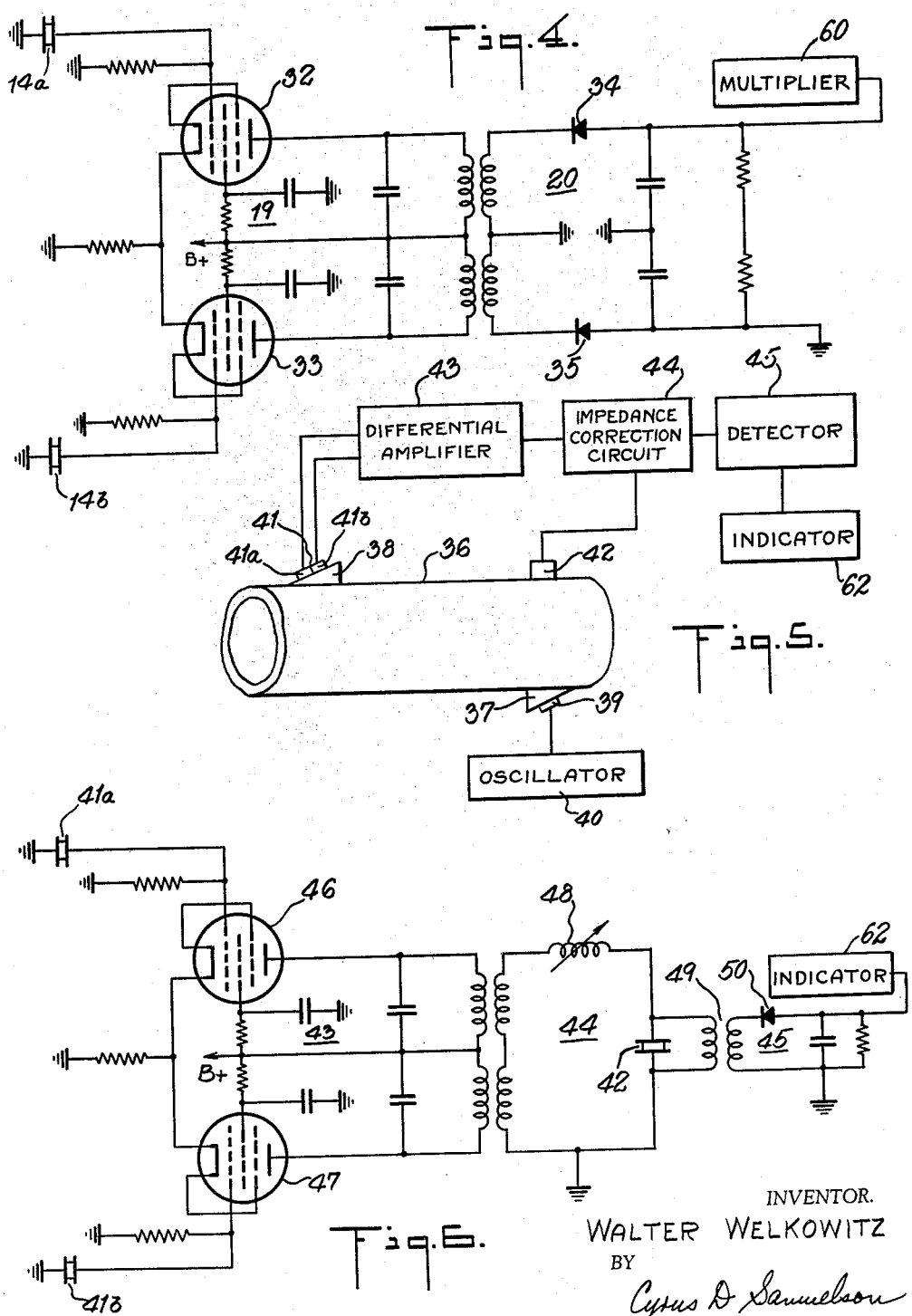

United States Patent Office 2,959,054
Patented Nov. 8, 1960

2,959,054

ULTRASONIC FLOWMETER

Walter Welkowitz, Metuchen, N.J., assignor to Gulton Industries, Inc., Metuchen, N.J., a corporation of New Jersey Filed Jan. 14, 1957, Ser. No. 633,867

4 Claims. (Cl. 73—194)

My invention relates to an ultrasonic flowmeter which may be utilized to measure the mass flow of a fluid in a pipe or similar container.

Most flowmeters, which are used at present, make measurements of fluid flow velocity and it is necessary to convert these measurements to mass flow in order for the measurements to be useful. These conversions are most generally accomplished by the use of special tables, slide rules or similar devices. More elaborate techniques using computers in conjunction with the velocity flowmeters so as to give direct readings in mass flow are also utilized.

There exists a need for a simple device which will indicate mass flow per unit time directly. Such a device will find use in aircraft wherein it is important to btain fuel consumption indications in pounds per hour nd in other vehicles, ships, missiles and like units in which the mass flow per unit time is useful and desirable.

Accordingly, it is a principal object of my invention to provide an economical device for measuring fluid mass flow per unit time.

It is a further object of my invention to provide such a device which utilizes ultrasonic waves for such measurements.

It is a still further object of my invention to provide means for including corrections for the density of the fluid and the temperature of the fluid directly.

It is a still further object of my invention to utilize a differential transducer for detecting the change in position of the ultrasonic beam with fluid flow.

These and other objects, advantages and features will become more apparent as the description proceeds when considered in view of the accompanying drawings in which:

Figure 1 is a block diagram of a preferred embodiment of my invention.

Figure 2 is a simplified schematic diagram of the impedance correction circuit.

Figure 3 is a schematic diagram of the combined driving oscillator and impedance correction circuit for the embodiment of Figure 1.

Figure 4 is a schematic diagram of the differential amplifier and detector circuit for the embodiment of Figure 1.

Figure 5 is a block diagram of a second embodiment of my invention, and

Figure 6 is a schematic diagram of the combined differential amplifier, impedance correction circuit and detector for the embodiment of Figure 5.

In the drawings, wherein for the purpose of illustration, are shown preferred embodiments of my invention, the numeral 10 designates a pipe on which are mounted wedges 11 and 12. Transmitting transducer 13 is mounted on wedge 11 so that the waves transmitted by it under excitation from oscillator 15 enter 10 at an angle of about 15° from the direction of the normal to pipe 10. Correction transducer 17 is mounted on pipe 10 and is electrically connected to oscillator 15 through impedance correction circuit 16. Correction transducer 17 serves to aid in the correction for changes in fluid density and temperature. The output of circuit 18 is fed to a multiplier 60. Differential transducer 14 consists of two spaced electromechanically sensitive bodies 14a and 14b such as have been described in the co-pending application of Lucien A. Petermann, Serial No. 551,599. The outputs of bodies 14a and 14b are fed to differential amplifier 19 and thence to detector 20. The output of detector 20 is also fed to multiplier 60 and the output of the multiplier is fed to indicator 62.

An alternative embodiment of my invention is shown in Figure 5 wherein the numeral 36 designates the pipe on which are mounted wedges 37 and 38 similar to the manner in which wedges 11 and 12 are mounted on pipe 10 (Figure 1). Transmitting transducer 39 is mounted on wedge 37 and is driven by oscillator 40. Differential transducer 41 is composed of elements 41a and 41b (similar to 14a and 14b of Figure 1) whose outputs are fed to differential amplifier 43. Correction transducer 42 is mounted on pipe 36 in a manner similar to that in which correction transducer 17 is mounted on pipe 10. Correction transducer 42 and the output of differential amplifier 43 are connected to impedance correction circuit 44 whose output is fed to detector 45. The output of detector 45 is fed to an indicator (not shown).

Transducers 13, 14, 17, 39, 41 and 42 may be made of any electromechanically sensitive material. I prefer to use quartz plates or plates of polarized electrostrictive material such as barium titanate. However, other polarized electrostrictive materials, piezoelectric materials or magnetostrictive materials may also be used for the transducers.

The multiplier 60, which I have not illustrated in detail, may be a standard circuit using diodes or may be an electromechanical potentiometer with a servo output.

The indicator 62 may be a meter, cathode ray electric eye, a cathode ray oscilloscope or any other instrument which will display voltages or voltage differences.

In operation, the embodiment of Figure 1 may be used to give a direct reading of mass flow (for example, pounds per hour of flow). My flowmeter uses C.—W. ultrasonic energy in conjunction with a differential transducer and is an improvement of the flowmeter described by Lucien A. Petermann in his co-pending application Serial No. 551,598. The ultrasonic beam is transmitted from transmitting transducer 13 under excitation from oscillator 15 and enters pipe 10 at an angle of about 15° to the normal to the pipe and is reflected several times at an oblique angle in pipe 10 and is received by differential transducer 14. Differential transducer 14 is so adjusted that equal outputs are generated by bodies 14a and 14b when there is no fluid flow in pipe 10. When there is fluid flow in pipe 10, the ultrasonic beam is deflected so that there is a difference in output between bodies 14a and 14b. This difference is amplified in differential amplifier 19 and detected in detector 20. The detected output from detector 20 is fed to multiplier 60 and thence to indicator 62 on which is displayed an indication which is proportional to flow velocity. The use of a number of reflections across pipe 10 effectively integrates the flow rate in the entire pipe for either turbulent or laminar flow.

In order to obtain a measurement of mass flow, corrections must be made for the fluid temperature on which the sound velocity is dependent and for the fluid density. Figure 2 serves to illustrate the theory underlying the correction technique I employ to compensate for the fluid density and temperature. 21 is a signal generator which supplies a constant driving voltage $E_c$. Transducer 17 has an impedance which, at resonance, is largely a capacitive component 23 shunted by a resistive component 24. The impedance of transducer 17 is directly proportional to the acoustic impedance of the medium. Inductance 22 is varied to balance out capacitive component 23, under which condition the output voltage $E_o$ is essentially proportional to the impedance $p_oV_c$ where $p_o$ is the fluid density and $V_c$ is the velocity of ultrasound in the medium. The usual measuring means may be employed to enable the user to determine the proper value of inductance 22 required to balance out the capacitance 23. For example, a resonance indicator (not shown) such as a meter, neon lamp or similar device may be connected in the plate circuit of amplifier 26. At resonance, which condition will be shown by a display of maximum R.-F. current on the indicator, the value of the inductive reactance of inductance 22 is equal to the value of the capacitive reactance of capacitance 23 and transducer 17 is essentially a pure resistive load.

Correction transducer 17 is mounted on pipe 10 with its surface in contact with the outer surface of pipe 10 or with the fluid. Impedance correction circuit 16 is fed from oscillator 15 and is connected to transducer 17 and so adjusted that it is a pure resistive load. The output voltage from impedance correction circuit 16 is detected in detector 18 whose output is fed to the multiplier where it is combined with the output from detector 20. The resulting output will now yield a display on the indicator which is proportional to the mass flow per unit time.

If the original angle of the beam (no fluid flow) with respect to pipe diameter is $a_0$, then the shift in angle with fluid flow is approximately $$a_1 - a_0 = \frac{V}{V_c}$$

where $a_1$ is the angle with fluid flow, $V_c$ is the ultrasonic velocity of propagation and $V$ is the fluid flow velocity. To obtain mass flow we apply the corrections for fluid density and temperature and since $Z_o$, the acoustic impedance of a fluid is the product of the density $p_o$ and velocity $V_c$ (dependent on temperature) both corrections may be obtained simultaneously by the use of impedance correction circuit 16 and transducer 17 from which is obtained an output proportional to $Z_o$.

It has been shown above that the output voltage from transducer 17 $E_o$ is essentially proportional to the impedance $p_oV_c$. The product of the flow velocity term and the impedance term will give an output proportional to the mass flow of the fluid:

$$E_o = K_1 \frac{V}{V_c} \cdot K_2 p_o V_c = K p_o V$$

where $K_1$, $K_2$ and $K$ are constants. Thus, the measured output voltage is independent of sound velocity and provides an accurate indication of the value of mass flow regardless of changes in the fluid density, temperature or other external factors.

Figure 3 illustrates a circuit which combines oscillator 15, impedance correction circuit 16 and detector 18. Driving transducer 13 is used as the frequency stabilizing element in a Pierce oscillator circuit in which 25 is the electron tube. The output of oscillator tube 25 is coupled to the control grid of amplifier 26 whose output is fed to variable inductance 22 which serves to balance out the capacitance of correction transducer 17 with which it is in series. The plate of amplifier tube 26 is coupled back to oscillator tube 25 through automatic gain control circuit 27 which comprises resistor 28 and rectifier 29 and serves to control the output of oscillator 15 and supply a constant voltage to impedance correction circuit 16. The output of impedance correction circuit 16 is coupled to detector 18 through transformer 30. The signal from impedance correction circuit 16 is rectified by rectifier 31 and applied to the multiplier.

Figure 4 illustrates a preferred circuit for differential amplifier 19 and detector 20. The output of body 14a is amplified by tuned amplifier 32 and the output of body 14b is amplified by tuned amplifier 33 which together contitute differential amplifier 19. When there is no fluid flow, the output of differential amplifier 19 is zero and when there is fluid flow, there is a detectable output which is fed to detector 20 wherein rectifiers 34 and 35 rectify the difference in the outputs of tuned amplifiers 32 and 33 and apply the rectified output to the multiplier.

An alternative embodiment of my invention is shown in Figure 5 wherein oscillator 40 drives transducer 39 and after several oblique reflections in pipe 36, the ultrasonic waves are received by differential transducer 41, comprised of bodies 41a and 41b. The outputs of differential transducer 41 are applied to different amplifier 43. The correction for fluid density and temperature is now applied at the output of differential amplifier 43. Correction transducer 42 is mounted on pipe 36 with its surface in contact with the outer surface of pipe 36 or with the fluid and is connected to impedance correction circuit 44 which is similar to impedance correction circuit 16. The output of differential amplifier 43 supplies the driving voltage to correction transducer 42 and the output of impedance correction circuit 44 is applied to detector 45 whose output is fed to indicator 62.

Figure 6 is a schematic diagram of combined differential amplifier 43, impedance correction circuit 44 and detector 45. The output of body 41a is fed to amplifier 46 and the output of body 41b is fed to amplifier 47. With no fluid flow, their outputs are equal and opposite and there is no resulting output. With fluid flow, a voltage is applied to impedance correction circuit 44 from differential amplifier 43 and inductance 48 is adjusted to balance out the capacity of correction transducer 42 so that the resulting impedance is essentially resistive and equal to the acoustic impedance of the fluid. The usual measuring means may be employed to enable the user to determine the proper value of inductance 48 which is required to balance out the capacitance of correction transducer 42. For example, a resonance indicator (not shown) such as a meter, neon lamp or similar device may be connected in impedance correction circuit 44. At resonance, which condition will be shown by a display of maximum R.-F. current on the indicator, the value of the inductive reactance of inductance 48 is equal to the value of the capacitive reactance of correction transducer 42 and correction transducer 42 is essentially a pure resistive load. The output of impedance correction circuit 44 is transformer coupled to detector 45 through transformer 49 and is rectified by rectifier 50, the output of which is fed to the indicator. The embodiment of Figures 5 and 6 eliminates the need for a separate multiplier and permits the production of smaller, more economical units.

While I have described my invention by means of specific examples and in specific embodiments, I do not wish to be limited thereto, for obvious modifications will occur to those skilled in the art without departing from the spirit of my invention or the scope of the subjoined claims.

Having thus described my invention, I claim:

1. An ultrasonic flowmeter comprising fluid flow-conducting means, fluid in said fluid flow-conducting means, a first electromechanically sensitive body, a second electromechanically sensitive body, oscillator means, a differential transducer, amplifying means, first detecting means, second detecting means, impedance correcting means, multiplying means, indicating means, said first electromechanically sensitive body being mounted on said fluid flow-conducting means such that ultrasonic vibrations produced in said first electromechanically sensitive body by said oscillator means are propagated across said fluid in said fluid flow-conducting means, said second electromechanically sensitive body being mounted on said fluid flow-conducting means, said differential transducer being mounted on said fluid flow-conducting means and displaced therealong from said first electromechanically sensitive body, said differential transducer receiving said ultrasonic vibrations propagated by said first electromechanically sensitive body, the output of said differential transducer being fed to said amplifying means and thence to said first detecting means, an output of said oscillator means being connected to said impedance correcting means, said impedance correcting means being connected to said second electromechanically sensitive body and to said second detecting means, the outputs of said first and said second detecting means being combined in said multiplying means, the output of said multiplying means being connected to said indicating means, said impedance correcting means being characterized by an adjustable inductance adjusted such that the resultant impedance of said inductance and said second electromechanically sensitive body is substantially resistive and the signal applied to said indicating means is independent of the velocity of ultrasound in the fluid and is proportional to the product of the fluid density and flow velocity, the same being the mass flow of said fluid in said fluid flow-conducting means, a buffer amplifier, an automatic gain control circuit, and an output transformer, said first electromechanically sensitive body being connected as the frequency stabilizing element of said oscillator, the output of said oscillator being fed to said buffer amplifier, said automatic gain control circuit comprising a rectifier and resistor connected in parallel and being connected from the output of said buffer amplifier to the input of said oscillator, the output of said buffer amplifier being connected to a series circuit comprising said adjustable inductance and a parallel circuit of said second electromechanically sensitive body and the primary of said output transformer.

2. An ultrasonic flowmeter comprising fluid flow-conducting means, fluid in said fluid flow-conducting means, a first electromechanically sensitive body, oscillator means, a differential transducer, amplifying means, detecting means, ultrasonic velocity correction means, said first electromechanically sensitive body being mounted on said fluid flow-conducting means such that ultrasonic vibrations produced in said first electromechanically sensitive body by said oscillator means are propagated across said fluid in said fluid flow-conducting means, said differential transducer being mounted on said fluid flow-conducting means and displaced therealong from said first electromechanically sensitive body, said differential transducer receiving said ultrasonic vibrations propagated by said first electromechanically sensitive body, the output of said differential transducer being connected to said amplifying means and thence to said detecting means, the output of said detecting means being connected to said indicating means, said ultrasonic velocity correction means comprising a second electromechanically sensitive body mounted on said fluid flow-conducting means and an adjustable inductance in series therewith, said adjustable inductance being adjusted such that the resultant impedance of said inductance and said second electromechanically sensitive body is substantially resistive, said ultrasonic velocity correction means being connected in said electrical circuit such that the signal applied to said indicating means is independent of the velocity of ultrasound in the fluid and is proportional to the product of the fluid density and flow velocity, the same being the mass flow of said fluid in said fluid flow-conducting means, coupling means, an output tank circuit in said amplifying means, said amplifying means comprising a pair of electronic amplifiers to each of whose inputs is connected one element of said differential transducer, the outputs of said amplifiers being combined in said output tank circuit and coupled by said coupling means to said ultrasonic velocity correction means, the output of said ultrasonic velocity correction means being connected to said detecting means.

3. An ultrasonic flowmeter comprising fluid flow-conducting means, fluid in said fluid flow-conducting means, a first wedge, a second wedge, a first electromechanically sensitive body, a second electromechanically sensitive body, oscillator means, a differential transducer, amplifying means, first detecting means, second detecting means, impedance correcting means, multiplying means, indicating means, said first wedge being mounted on said fluid flow-conducting means, said first electromechanically sensitive body being mounted on said first wedge such that ultrasonic vibrations produced in said first electromechanically sensitive body by said oscillator means are propagated across said fluid in said fluid flow-conducting means, said second electromechanically sensitive body being mounted on said fluid flow-conducting means, said second wedge being mounted on said fluid flow-conducting means and displaced therealong from said first wedge, said differential transducer being mounted on said second wedge, said differential transducer receiving said ultrasonic vibrations propagated by said first electromechanically sensitive body, the output of said differential transducer being fed to said amplifying means and thence to said first detecting means, an output of said oscillator means being connected to said impedance correcting means, said impedance correcting means being connected to said second electromechanically sensitive body and to said second detecting means, the outputs of said first and said second detecting means being combined in said multiplying means, the output of said multiplying means being connected to said indicating means, said impedance correcting means being characterized by an adjustable inductance adjusted such that the resultant impedance of said inductance and said second electromechanically sensitive body is substantially resistive and the signal applied to said indicating means is independent of the velocity of ultrasound in the fluid and is proportional to the product of the fluid density and flow velocity, the same being the mass flow of said fluid in said fluid flow-conducting means, a buffer amplifier, an automatic gain control circuit, an output transformer, said first electromechanically sensitive body being connected as the frequency stabilizing element of said oscillator, the output of said oscillator being fed to said buffer amplifier, said automatic gain control circuit comprising a rectifier and resistor connected in parallel and being connected from the output of said buffer amplifier to the input of said oscillator, the output of said buffer amplifier being connected to a series circuit comprising said adjustable inductance and a parallel circuit of said second electromechanically sensitive body and the primary of said output transformer.

4. An ultrasonic flowmeter comprising fluid flow-conducting means, fluid in said fluid flow-conducting means, a first wedge, a second wedge, a first electromechanically sensitive body, oscillator means, a differential transducer, amplifying means, detecting means, ultrasonic velocity correction means, said first wedge being mounted on said fluid flow-conducting means, said first electromechanically sensitive body being mounted on said first wedge such that ultrasonic vibrations produced in said first electromechanically sensitive body by said oscillator means are propagated across said fluid in said fluid flow-conducting means, said second wedge being mounted on said fluid flow-conducting means and displaced therealong from said first wedge, said differential transducer being mounted on said second wedge, said differential transducer receiving said ultrasonic vibrations propagated by said first electromechanically sensitive body, the output of said differential transducer being connected to said amplifying means and thence to said detecting means, the output of said detecting means being connected to said indicating means, said ultrasonic velocity correction means comprising a second electromechanically sensitive body mounted on said fluid flow-conducting means and an adjustable inductance in series therewith, said adjustable inductance being adjusted such that the resultant impedance of said inductance and said second electromechanically sensitive body is substantially resistive, said ultrasonic velocity correction means being connected in said electrical circuit such that the signal applied to said indicating means is independent of the velocity of ultrasound in the fluid and is proportional to the product of the fluid density and flow velocity, the same being the mass flow of said fluid in said fluid flow-conducting means, coupling means, an output tank circuit in said amplifying means, said amplifying means comprising a pair of electronic amplifiers to each of whose inputs is connected one element of said differential transducer, the outputs of said electronic amplifiers being combined in said output tank circuit and coupled by said coupling means to said ultrasonic velocity correction means, the output of said ultrasonic correction means being connected to said detecting means.

References Cited in the file of this patent

UNITED STATES PATENTS

| | | |
|---|---|---|
| 2,480,646 | Grabau | Aug. 30, 1949 |
| 2,536,802 | Fehr et al. | June 2, 1951 |
| 2,612,772 | McConnell | Oct. 7, 1952 |
| 2,711,646 | Mendousse | June 28, 1955 |
| 2,869,357 | Kritz | Jan. 20, 1959 |
| 2,874,568 | Petermann | Feb. 24, 1959 |